F. G. WINKELMAN.
COOKING UTENSIL.
APPLICATION FILED SEPT. 19, 1919.

1,379,072.

Patented May 24, 1921.

UNITED STATES PATENT OFFICE.

FRED G. WINKELMAN, OF MANITOWOC, WISCONSIN.

COOKING UTENSIL.

1,379,072. Specification of Letters Patent. Patented May 24, 1921.

Application filed September 19, 1919. Serial No. 324,752.

*To all whom it may concern:*

Be it known that I, FRED G. WINKELMAN, a citizen of the United States, and resident of Manitowoc, in the county of Manitowoc and State of Wisconsin, have invented certain new and useful Improvements in Cooking Utensils; and I do hereby declare that the following is a full, clear, and exact description thereof.

My invention relates to new and useful improvements in culinary utensils, and more particularly to cooking vessels.

It is the object of this invention to provide a utensil having means whereby individual portions of food may be separately cooked. This invention will have particular application to the cooking of eggs, pancakes and the like, where it is advisable that each item of food be kept separate and distinct from the others.

It is further the object of my invention to provide a cooking vessel of this type having a supplemental compartment or reservoir in which lard, butter or like material may be stored to be used in the other portions of the utensil as desired by the cook.

In this connection it is also provided that the surplus lard or the like may be readily drained from the several food compartments to the reservoir, such draining taking place through communicating channels which extend from each of the former to the latter. These channels incidentally provide a means whereby a suitable implement may be inserted beneath the article of food being cooked so as to lift the same from the utensil without mutilating it.

With these general objects and advantages in view the invention resides in the novel features of construction and arrangement of parts which will be hereinafter more particularly described.

Figure 1:
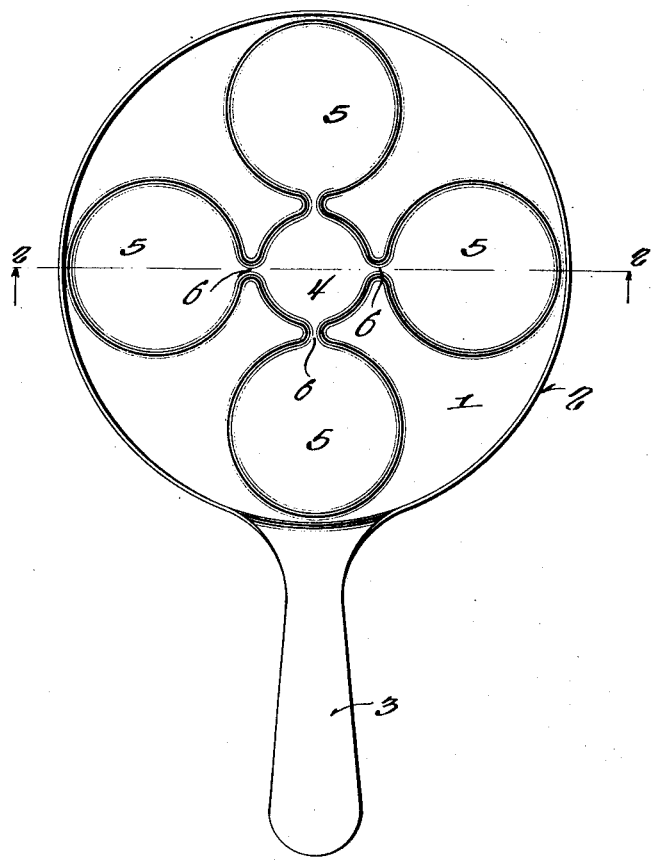
Figure 2:
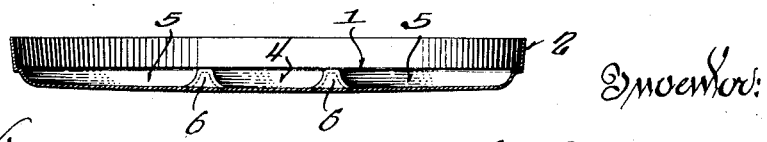

In the accompanying drawings:

Figure 1 represents a plan view of a utensil constructed in accordance with the invention, and Fig. 2 is a diametrical section taken on the plane of the line 2—2 of Fig. 1.

One embodiment of the invention is illustrated in the accompanying drawing, wherein it will be seen that this utensil consists of a relatively shallow or pan-like vessel 1 having an upstanding peripheral wall or flange 2, and a suitable handle 3. In other words the device is similar in shape to the usual frying pan or skillet.

The pan 1 is preferably circular and has a substantially circular central depression forming a reservoir of grease holding compartment 4. Disposed around this reservoir and between it and the wall 2 are a number of cup-like pockets or compartments 5 for retaining the articles of food while being cooked. Each of these compartments 5 is also preferably circular, although they may well be any other shape, and relatively shallow.

In the present instance the several compartments 5 are positioned radially with respect to the reservoir 4 and each communicating therewith by means of a channel 6. From Fig. 2 it will be seen that the bottom of the reservoir 4 is lower than the bottoms of the compartments 5 and that the latter drain inwardly toward the center of the pan 1 and into said reservoir through the communicating channels 6. As a result of this construction surplus butter or lard or other like material placed in the cooking compartments 5 will drain into the central reservoir.

In addition to providing means of communication between the several pockets 5 and the reservoir 4, the channels 6 form a recess in each of the said cooking compartments 5 to permit a suitable pointed implement to be inserted between the wall of the latter and the article of food being cooked to allow the same to be lifted from the utensil without mutilation. The lifting implement has not been illustrated, but it is to be understood that the same may be of any special or ordinary design to perform the necessary functions.

What is claimed is:

A utensil of the class described comprising a receptacle having a central reservoir for grease or the like, and a plurality of pockets adapted to receive material to be cooked, said pockets being radially disposed about said reservoir and annularly spaced, the bottom of the reservoir being lower than the bottoms of the pockets and connected therewith by channels, each channel forming with the bottom of the corresponding pocket a drain of constant slope into said reservoir whereby surplus grease placed in the pockets will drain into the central reservoir.

In testimony that I claim the foregoing I have hereunto set my hand at Manitowoc, in the county of Manitowoc and State of Wisconsin.

FRED G. WINKELMAN.